(12) United States Patent
Williams

(10) Patent No.: US 6,171,043 B1
(45) Date of Patent: *Jan. 9, 2001

(54) CORNER JACK CONNECTOR WITH PRONGS

(75) Inventor: Troy D. Williams, Knoxville, TN (US)

(73) Assignee: Metal Truss, L.L.C., Knoxville, TN (US)

( * ) Notice: Under 35 U.S.C. 154(b), the term of this patent shall be extended for 0 days.

This patent is subject to a terminal disclaimer.

(21) Appl. No.: 09/342,292

(22) Filed: Jun. 29, 1999

(51) Int. Cl.$^7$ ................ F16B 15/00; B65G 3/28
(52) U.S. Cl. .............. 411/466; 411/461; 403/283; 52/712
(58) Field of Search .................. 411/457, 461, 411/466, 467; 52/712; 403/283, 232.1, 237

(56) References Cited

U.S. PATENT DOCUMENTS

| 1,161,559 | | 11/1915 | Weigel . | |
|---|---|---|---|---|
| 1,308,265 | | 7/1919 | Spear et al. . | |
| 1,913,864 | * | 6/1933 | Walper . | |
| 2,666,508 | | 1/1954 | Nardulli . | |
| 2,757,890 | | 8/1956 | Sutton et al. . | |
| 2,785,035 | | 3/1957 | Hammer . | |
| 3,481,635 | * | 12/1969 | Tracy | 403/232.1 |
| 3,603,197 | * | 9/1971 | Wood | 403/283 |
| 4,236,847 | | 12/1980 | Yasuda . | |
| 4,639,176 | * | 1/1987 | Smith . | |
| 4,710,083 | | 12/1987 | Wolf . | |
| 5,457,927 | | 10/1995 | Pellock . | |
| 5,531,052 | * | 7/1996 | Agar . | |
| 5,797,694 | * | 8/1998 | Breivik | 403/237 |

OTHER PUBLICATIONS

Simpson Strong–Tie Inc., Catalog C–96, p. 48, Jan. 1996.*
Metal Truss Notes—vol. 2, Issue 1—Metal Truss, LLC—Fall 1998.
FA/FAP/HFA/FJA FSA Foundaton Anchors—Simpson Strong–Tie Co., Inc.—Catalog C–98, pp. 23, 51.
Sweets catalog–Simpson Strong Tie Connectors, strap tie located at bottom of page.
Sweets catalog–Simpson Strong Tie, p. 57, tie plate item tp located at top of page.

* cited by examiner

Primary Examiner—Flemming Saether
(74) Attorney, Agent, or Firm—Pitts & Brittian, P.C.

(57) ABSTRACT

A corner jack connector having integral prongs is provided. The corner jack connector is formed of a substantially planar piece of rigid material, preferably steel, and is configured so as to allow joining of wooden work pieces at various angles to one another as will be readily understood by those skilled in the art. The corner jack connector includes a central portion and first and second extensions disposed in spaced relation from each other and integral with the central portion. The skewable corner jack connector includes a plurality of integral prongs for securing the corner jack connector to the work pieces. In order to facilitate skewing of the corner jack connector, a plurality of hole members, which are preferably elliptical, are disposed along fold regions at the junction between the central portion and each of the extensions. In the preferred embodiment, the extensions are disposed at a right angle to each other.

14 Claims, 3 Drawing Sheets

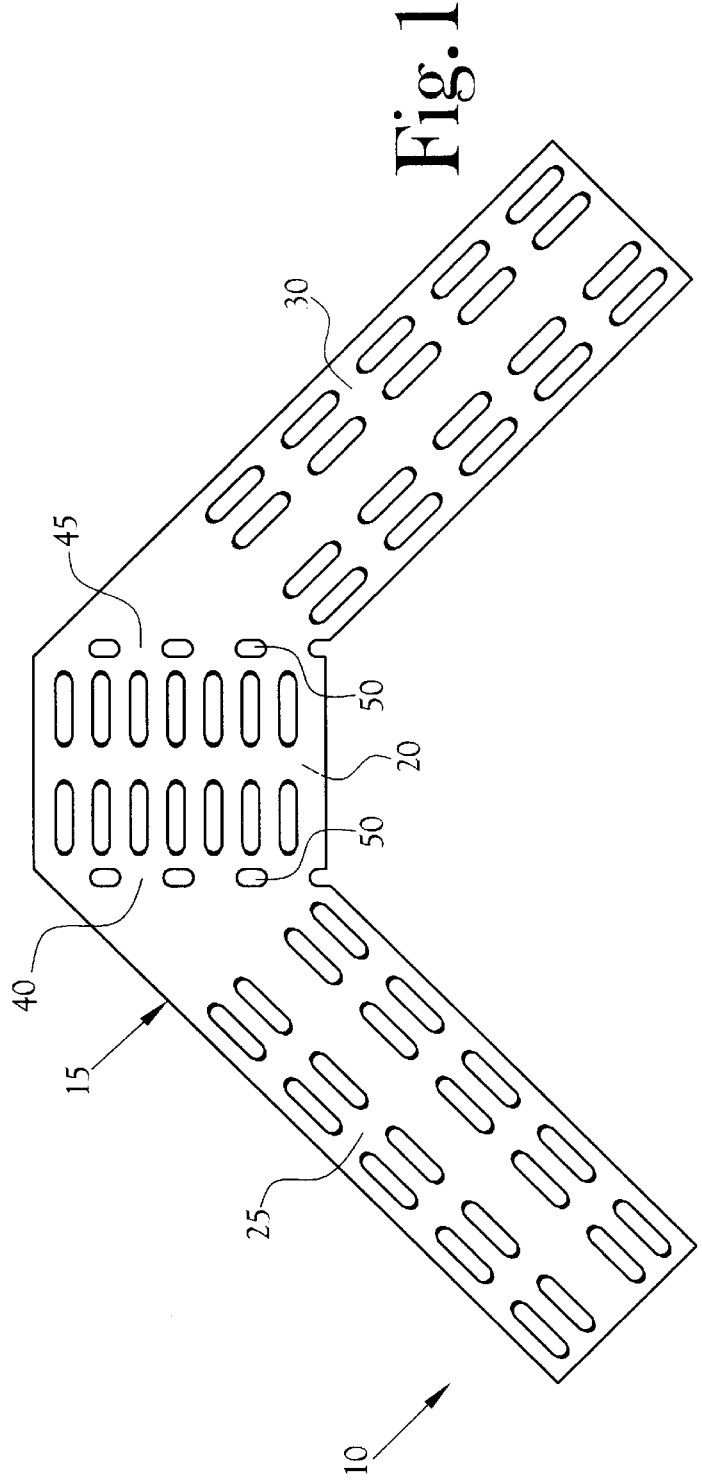
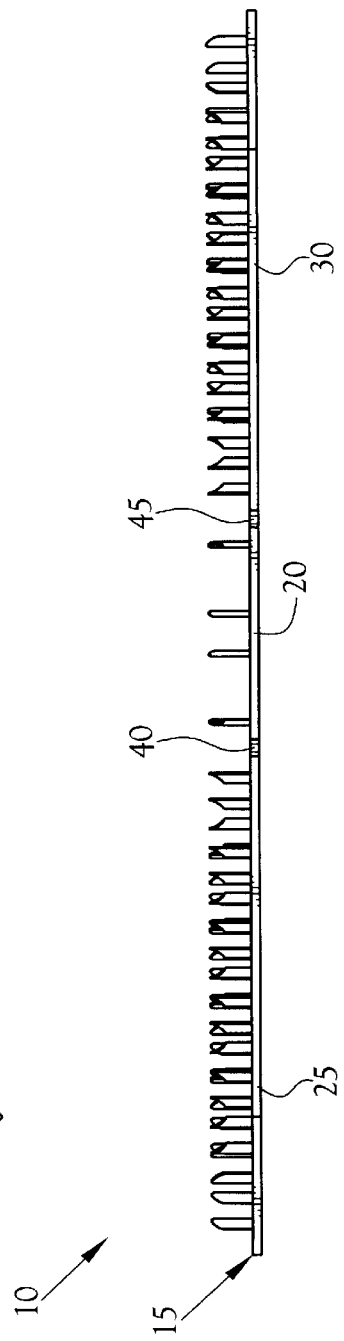

CORNER JACK CONNECTOR WITH PRONGS

CROSS-REFERENCE TO RELATED APPLICATIONS

This application in part discloses and claims subject matter disclosed in my earlier filed application, Ser. No. 29/095,767, filed on Oct. 29, 1998.

STATEMENT REGARDING FEDERALLY SPONSORED RESEARCH OR DEVELOPMENT

Not Applicable

BACKGROUND OF THE INVENTION

1. Field of Invention

This invention relates to a device for joining two elongated work pieces. More specifically, it relates to a corner jack connector having prongs.

2. Description of the Related Art

It is known in the art to use a planar piece of metal to act as joinery for abutting wooden work pieces, such as, for instances, joists or corner jacks in order to create a stronger joint than merely securing the work pieces together with a nail or other metal fastener. However, there is a need for a corner jack connector that is skewable and that has integral prongs for securing the connector to the workpiece.

It is therefore an object of the present invention to provide a corner jack connector that is skewable to allow for different angles of joinery.

It is a further object of the present invention to provide a corner jack that has integral prongs for securing the corner jack connector to the work pieces.

Other objects and advantages over the prior art will become apparent to those skilled in the art upon reading the detailed description together with the drawings as described as follows.

BRIEF SUMMARY OF THE INVENTION

In accordance with the teachings of the present invention a skewable corner jack connector having integral prongs is provided. The corner jack connector is formed of a substantially planar piece of rigid material, preferably steel, and is configured so as to allow joining of wooden work pieces at various angles to one another as will be readily understood by those skilled in the art. The corner jack connector includes a central portion and first and second extensions disposed in spaced relation from each other and integral with the central portion. The skewable corner jack connector includes a plurality of integral prongs for securing the corner jack connector to the work pieces. In order to facilitate skewing of the corner jack connector, a plurality of hole members, which are preferably elliptical, are disposed along fold regions at the junction between the central portion and each of the extensions. In the preferred embodiment, the extensions are disposed at a right angle to each other.

BRIEF DESCRIPTION OF THE SEVERAL VIEWS OF THE DRAWINGS

The above-mentioned features of the invention will become more clearly understood from the following detailed description of the invention read together with the drawings in which:

FIG. 1 is a top plan view of the corner jack connector of the present invention.

FIG. 2 is an inverted side elevation view of the corner jack connector of the present invention.

DETAILED DESCRIPTION OF THE INVENTION

Figure 3:
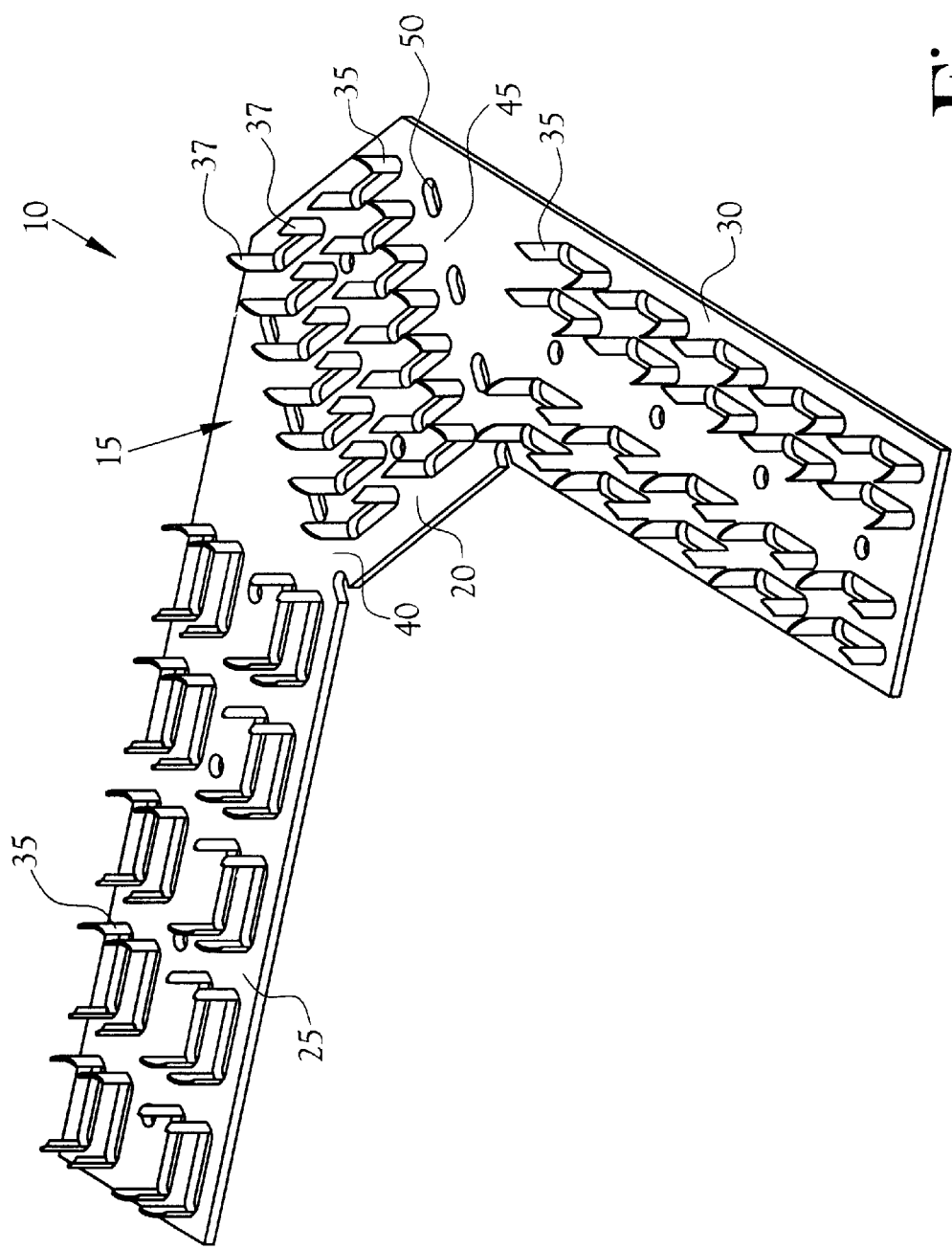
FIG. 3 is a bottom perspective view of the present invention showing the integral prongs.
Figure 4:
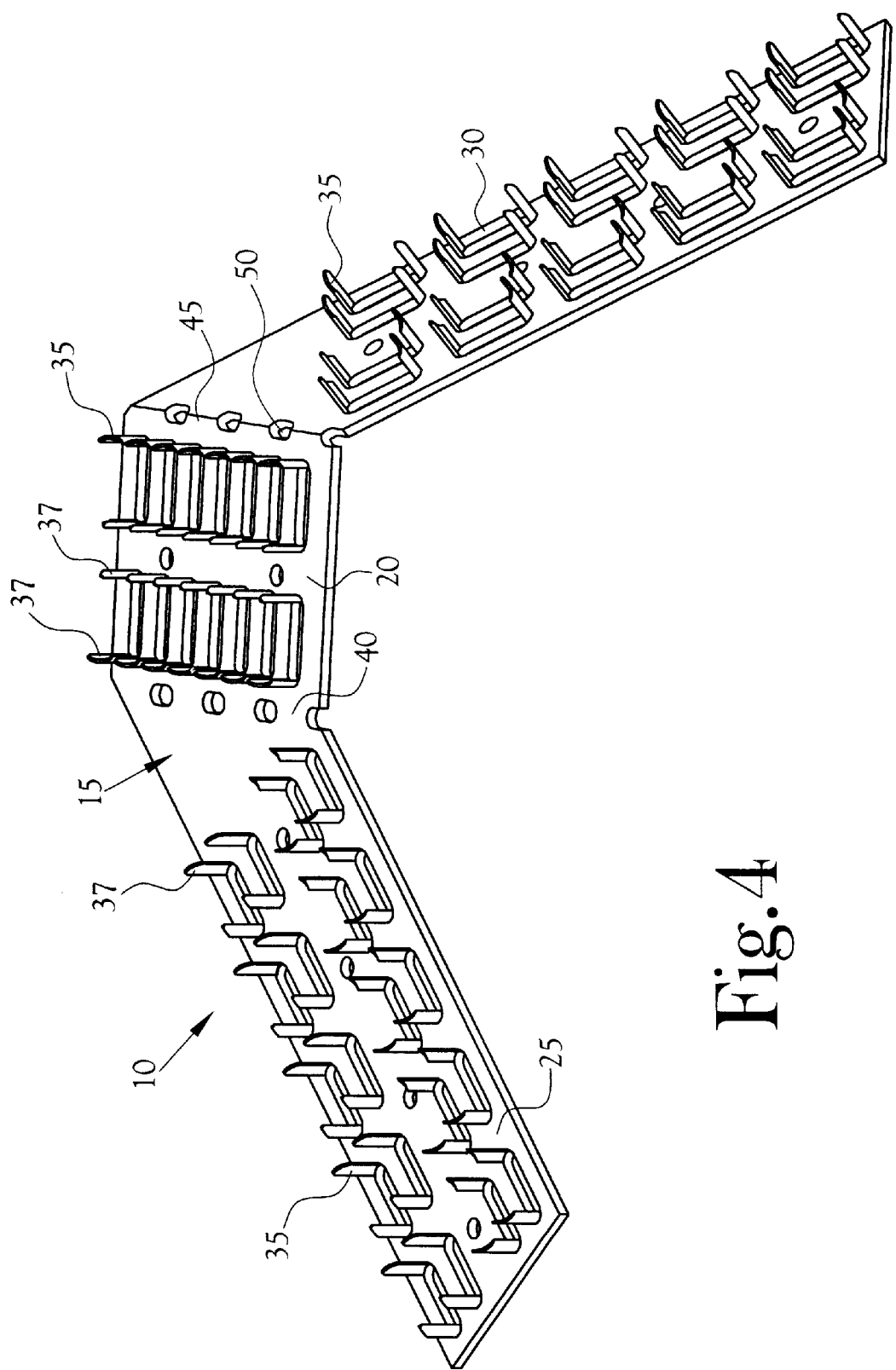
FIG. 4 is a bottom perspective view of the present invention in which one of the extensions has been skewed.

A corner jack connector for joining at least a pair of work pieces, constructed in accordance with the present invention, is illustrated generally as 10 in the figures. The corner jack connector 10 includes a substantially planar member 15 that includes a central region 20, a first extension 25 and a second extension 30. The first extension 25 and the second extension 30 are, preferably, integral with the central region 20 and are disposed in spaced relation from each other, and in one embodiment are disposed at a right angle to one another. Further, the central region 20, the first extension 25 and the second extension 30 are, in a single plane, and are adapted to allow either the first extension 25, the second extension 30 or both to be skewed such that the skewed extension lies in a different plane from the central region 20 as illustrated in FIG. 4.

It will be appreciated that if the work pieces to be joined are to be joined at angles other than perpendicular, the first extension 25 and the second extension 30 will likewise be disposed at an angle other than perpendicular. In the preferred embodiment, corner jack connector 10 is fabricated from a strong, rigid material, preferably steel. Further, in the preferred embodiment, the corner jack connector 10 includes a plurality of integral prongs 35 that extend from the planar member 15 for securing the corner jack connector to the work pieces without the necessity of using nails or other mechanical fasteners. The prongs 35 are preferably stamped from the planar member 15 and bent into position so as to be integral with planar member 15. In the preferred embodiment, the prongs are slightly curved from side to side to provide rigidity. In addition, in the preferred embodiment, the prongs have pointed tips 37 to provide for easier penetration into the workpiece. For applications in which the work pieces to be joined are not in a single plane, the corner jack connector 10 is skewable along fold regions 40 and 45 at the junction between the central portion and each of the extensions. In order to facilitate skewing of the corner jack connector 10, a plurality of hole members 50, which are preferably elliptical, are disposed along fold regions 40 and 45.

From the foregoing description, it will be recognized by those skilled in the art that a skewable corner jack connector offering advantages over the prior art has been provided. Specifically, the corner jack connector of the present invention provides a corner jack connector that is skewable to allow for different angles of joinery and that has integral prongs for securing the corner jack connector to the work pieces.

While a preferred embodiment has been shown and described, it will be understood that it is not intended to limit the disclosure, but rather it is intended to cover all modifications and alternate methods falling within the spirit and the scope of the invention as defined in the appended claims.

What is claimed is:

1. A corner jack connector for joining at least two work pieces, said corner jack connector comprising:

a substantially planar member constructed of a rigid material, said planar member including a central region, a first extension and a second extension, wherein said first and second extensions are integral with said central region and are disposed in spaced relation from each other and are disposed at a selected angle from one another;

a plurality of integral prongs extending from a same side of said central region and said first and second extensions of said planar member for securing said corner jack connector to a work piece;

a plurality of hole members disposed at a junction of said first extension and said central region; and a plurality of hole members disposed at a junction of said second extension and said central region, wherein said hole members allow said first and said second extensions to be skewable away from a plane defined by said central region.

2. The corner jack connector of claim 1 wherein said first extension and said second extension are disposed at a right angle to one another.

3. The corner jack connector of claim 1 wherein said rigid material is steel.

4. The corner jack connector of claim 1 wherein said hole members are elliptical.

5. The corner jack connector of claim 1 wherein said prongs are slightly curved from side to side.

6. The corner jack connector of claim 1 wherein said prongs include pointed tips.

7. A corner jack connector for joining at least two work pieces, said corner jack connector comprising:

a substantially planar member constructed of a rigid material, said planar member including a central region, a first extension and a second extension, wherein said first and second extensions are integral with said central region and are disposed in spaced relation from each other and are disposed at a selected angle from one another;

a plurality of integral prongs extending from a same side of said central region and said first and second extensions of said planar member for securing said corner jack connector to a work piece;

a plurality of elliptical hole members disposed at a junction of said first extension and said central region; and a plurality of elliptical hole members disposed at a junction of said second extension and said central region, wherein said hole members allow said first and said second extensions to be skewable away from a plane defined by said central region.

8. The corner jack connector of claim 7 wherein said first extension and said second extension are disposed at a right angle to one another.

9. The corner jack connector of claim 7 wherein said rigid material is steel.

10. The corner jack connector of claim 7 wherein said prongs are slightly curved from side to side.

11. The corner jack connector of claim 7 wherein said prongs include pointed tips.

12. A corner jack connector for joining at least two work pieces, said corner jack connector comprising:

a substantially planar member constructed of a rigid material, said planar member including a central region, a first extension and a second extension, wherein said first and second extensions are integral with said central region and are disposed in spaced relation from each other and are disposed at a right angle from one another;

a plurality of integral prongs extending from a same side of said central region and said first and second extensions of said planar member for securing said corner jack connector to a work piece, wherein said prongs are slightly curved from side to side and include pointed tips;

a plurality of elliptical hole members disposed at a junction of said first extension and said central region; and a plurality of elliptical hole members disposed at a junction of said second extension and said central region, wherein said hole members allow said first and said second extensions to be skewable away from a plane defined by said central region.

13. The corner jack connector of claim 12 wherein said first extension and said second extension are disposed at a right angle to one another.

14. The corner jack connector of claim 12 wherein said rigid material is steel.

* * * * *